US012160385B2

(12) United States Patent
Braun et al.

(10) Patent No.: US 12,160,385 B2
(45) Date of Patent: Dec. 3, 2024

(54) SINGLE CARRIER CONTROL CHANNEL

(71) Applicant: Nokia Technologies Oy, Espoo (FI)

(72) Inventors: Volker Braun, Stuttgart (DE); Paolo Baracca, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 334 days.

(21) Appl. No.: 17/637,555

(22) PCT Filed: Sep. 3, 2019

(86) PCT No.: PCT/FI2019/050623
§ 371 (c)(1),
(2) Date: Feb. 23, 2022

(87) PCT Pub. No.: WO2021/044074
PCT Pub. Date: Mar. 11, 2021

(65) Prior Publication Data
US 2022/0286260 A1    Sep. 8, 2022

(51) Int. Cl.
*H04L 5/00*     (2006.01)
*H04L 27/26*    (2006.01)
*H04W 72/23*    (2023.01)

(52) U.S. Cl.
CPC ........ *H04L 5/0053* (2013.01); *H04L 27/2636* (2013.01); *H04W 72/23* (2023.01)

(58) Field of Classification Search
None
See application file for complete search history.

(56) References Cited

U.S. PATENT DOCUMENTS

| 8,400,939 | B2 | 3/2013 | Kim et al. |
| 8,861,394 | B2 | 10/2014 | Han et al. |
| 9,363,797 | B2 | 6/2016 | Freda et al. |
| 9,723,594 | B2 | 8/2017 | Han et al. |
| 2006/0098679 | A1 | 5/2006 | Cheng et al. |
| 2014/0286292 | A1 | 9/2014 | Park |
| 2018/0192405 | A1* | 7/2018 | Gong ............... H04L 1/0045 |
| 2019/0068424 | A1 | 2/2019 | Park et al. |
| 2019/0069276 | A1 | 2/2019 | Kwak et al. |
| 2019/0191360 | A1* | 6/2019 | Sun ................. H04L 5/0051 |
| 2019/0261323 | A1* | 8/2019 | Lee ................. H04L 5/0007 |
| 2021/0297300 | A1* | 9/2021 | Zhang ............. H04L 27/2626 |

FOREIGN PATENT DOCUMENTS

| CA | 3046405 A1 | 6/2018 |
| WO | 2008/041110 A2 | 4/2008 |

(Continued)

OTHER PUBLICATIONS

Extended European Search Report received for corresponding European Patent Application No. 19944393.8, dated Apr. 24, 2023, 9 pages.

(Continued)

*Primary Examiner* — Marcus Smith
(74) *Attorney, Agent, or Firm* — Barta Jones, PLLC

(57) ABSTRACT

A spreading sequence is determined (S301) based on a candidate of a control channel of a control resource set, the candidate comprising a sequence of control information. The sequence of control information and the determined spreading sequence are multiplied (S303), thereby obtaining a spread series of control information.

12 Claims, 9 Drawing Sheets

(56) References Cited

FOREIGN PATENT DOCUMENTS

WO  2016/041570 A1  3/2016
WO  2020/228950 A1  11/2020

OTHER PUBLICATIONS

"Revised SID on Study on NR beyond 52.6GHz", 3GPP TSG RAN Meeting #81, RP-182066, Agenda: 9.3.16, Intel Corporation, Sep. 10-13, 2018, 4 pages.

"New SID on NR waveform beyond 52.6GHz", 3GPP TSG RAN Meeting #79, RP-180453, Agenda: 9.1.2, Qualcomm, Mar. 19-22, 2019, 4 pages.

"New SID: Study on NR design above 52.6GHz", 3GPP TSG RAN Meeting #79, RP-180320, Agenda: 9.1.2, Intel Corporation, Mar. 19-22, 2018, 4 pages.

Purohit et al., "OVSF code generator for 3G wireless transceivers using Xilinx System Generator", International Conference on Control, Automation, Robotics and Embedded Systems (CARE), Dec. 16-18, 2013, 5 pages.

Kim et al., "Multiple Access for 5G New Radio: Categorization, Evaluation, and Challenges", arXiv, Mar. 27, 2017, pp. 1-9.

"LTE Quick Reference—CCE Index Calculation", ShareTechNote, Retrieved on Feb. 28, 2022, Webpage available at : https://www.sharetechnote.com/html/Handbook_LTE_CCE_Index.html.

International Search Report and Written Opinion received for corresponding Patent Cooperation Treaty Application No. PCT/FI2019/050623, dated Jun. 2, 2020, 13 pages.

"On Configuration of Control Resource Sets and Search Space", 3GPP TSG RAN1 WG1 Meeting #90bis, R1-1718628, Agenda: 7.3.1.2, Ericsson, Oct. 9-13, 2017, 10 pages.

"On PDCCH Enhancements for NR URLLC", 3GPP TSG RAN WG1#98, R1-1908436, Agenda: 7.2.6.1, Nokia, Aug. 26-30, 2019, 21 pages.

* cited by examiner

Fig. 7

| AL | 1 | 2 | 4 | 8 | 16 |
|---|---|---|---|---|---|
| # candidates configured | 4 | 4 | 2 | 2 | 1 |
| | | | | | CCE index of CORESET |

PDCCH candidate index table with CCE indices 0-15

Fig. 8

| SF=1 | SF=2 | SF=4 | SF=8 | SF=16 | Rule |
|---|---|---|---|---|---|
| c1,1=(1) | c2,1=(1,1) | c4,1=(1,1,1,1) | c8,1=(1,1,1,1,1,1,1,1) | c16,1=(1,1,1,1,1,1,1,1,1,1,1,1,1,1,1,1) | (c) |
| | | | | c16,2=(1,1,1,1,1,1,1,1,-1,-1,-1,-1,-1,-1,-1,-1) | (c,-c) |
| | | | c8,2=(1,1,1,1,-1,-1,-1,-1) | c16,3=(1,1,1,1,-1,-1,-1,-1,1,1,1,1,-1,-1,-1,-1) | |
| | | | | c16,4=(1,1,1,1,-1,-1,-1,-1,-1,-1,-1,-1,1,1,1,1) | |
| | | c4,2=(1,1,-1,-1) | c8,3=(1,1,-1,-1,1,1,-1,-1) | c16,5=(1,1,-1,-1,1,1,-1,-1,1,1,-1,-1,1,1,-1,-1) | |
| | | | | c16,6=(1,1,-1,-1,1,1,-1,-1,-1,-1,1,1,-1,-1,1,1) | |
| | | | c8,4=(1,1,-1,-1,-1,-1,1,1) | c16,7=(1,1,-1,-1,-1,-1,1,1,1,1,-1,-1,-1,-1,1,1) | |
| | | | | c16,8=(1,1,-1,-1,-1,-1,1,1,-1,-1,1,1,1,1,-1,-1) | |
| | c2,1=(1,-1) | c4,3=(1,-1,-1,1) | c8,5=(1,-1,1,-1,1,-1,1,-1) | c16,9=(1,-1,1,-1,1,-1,1,-1,1,-1,1,-1,1,-1,1,-1) | |
| | | | | c16,10=(1,-1,1,-1,1,-1,1,-1,-1,1,-1,1,-1,1,-1,1) | |
| | | | c8,6=(1,-1,1,-1,-1,1,-1,1) | c16,11=(1,-1,1,-1,-1,1,-1,1,1,-1,1,-1,-1,1,-1,1) | |
| | | | | c16,12=(1,-1,1,-1,-1,1,-1,1,-1,1,-1,1,1,-1,1,-1) | |
| | | c4,4=(1,-1,-1,1) | c8,7=(1,-1,-1,1,1,-1,-1,1) | c16,13=(1,-1,-1,1,1,-1,-1,1,1,-1,-1,1,1,-1,-1,1) | |
| | | | | c16,14=(1,-1,-1,1,1,-1,-1,1,-1,1,1,-1,-1,1,1,-1) | |
| | | | c8,8=(1,-1,-1,1,-1,1,1,-1) | c16,15=(1,-1,-1,1,-1,1,1,-1,1,-1,-1,1,-1,1,1,-1) | |
| | | | | c16,16=(1,-1,-1,1,-1,1,1,-1,-1,1,1,-1,1,-1,-1,1) | |

Fig. 9

SINGLE CARRIER CONTROL CHANNEL

RELATED APPLICATION

This application was originally filed as PCT Application No. PCT/FI2019/050623 on Sep. 3, 2019, each of which is incorporated herein by reference in its entirety.

TECHNICAL FIELD

At least some example embodiments relate to a single carrier control channel for conveying control information between a network entity and a communication device.

List of Abbreviations

AL Aggregation Level
BW Bandwidth
CCE Control Channel Element
CORESET Control Resource Set
DCI Downlink Control Information
DFT Discrete Fourier Transform
DL Downlink
FDMA Frequency Division Multiple Access
gNB NR Base Station
IFFT Inverse Fast Fourier Transform
LTE Long-term Evolution
NR New Radio
OFDM Orthogonal Frequency Division Multiplexing
OVSF Orthogonal Variable Spreading Factor
PAPR Peak-to-Average Power Ratio
PDCCH Physical Downlink Control Channel
RF Radio Frequency
SC Single Carrier
SS Search Space
UMTS Universal Mobile Telephone System
UE User Equipment

BACKGROUND

Single Carrier modulation (such as SC-FDMA used in LTE/NR uplink) is a likely candidate for NR at carrier frequencies above 52.6 GHz due to better power efficiency (e.g. reduced PAPR) as compared to OFDM.

An NR PDCCH is used to schedule uplink and downlink data channels. Information carried on PDCCH is called downlink control information (DCI). To receive DCI on NR PDCCH, a UE monitors a set of PDCCH candidates in one or more configured monitoring occasions in one or more configured COntrol REsource SETs (CORESETs) according to search space set (SS-Set) configurations.

The smallest logical entity to convey a DCI is called a Control Channel Element (CCE). Aggregation of 1, 2, 4, 8 or 16 CCEs can be applied to improve reliability of DCI transmission by reducing the code rate, where the number of CCEs to convey the DCI is called the Aggregation Level (AL). The SS-set configuration of a user includes an integer number (0, 1, 2, . . . ) of PDCCH candidates for each of the ALs.

SUMMARY

At least some example embodiments aim at adopting design of a control channel (e.g. a PDCCH) for conveying control information between a network entity (e.g. a gNB) and a communication device (e.g. a UE) to single carrier modulation.

This is achieved by the methods, apparatuses and non-transitory computer-readable storage media as specified by the appended claims.

According to at least some example embodiments, hierarchical spreading of modulated DCI symbol sequences is applied, such that after spreading signals related to the DCIs have equal size.

According to at least some example embodiments, indices of spreading codes are assigned via a hash function.

According to at least some example embodiments, all DCIs are under spread with a single DFT.

According to at least some example embodiments, a UE has to monitor only a single SS-set.

In the following, example embodiments and example implementations will be described with reference to the accompanying drawings.

BRIEF DESCRIPTION OF THE DRAWINGS

FIG. 7 illustrates PDCCH candidates allocated for different ALs and corresponding CCEs of a CORESET.

FIG. 8 illustrates hierarchical spreading codes mapped to PDCCH candidates according to at least some example implementations.

FIG. 9 illustrates a code tree.

DESCRIPTION OF THE EMBODIMENTS

At least some example embodiments are concerned with adopting design of a control channel (e.g. a PDCCH) for conveying control information between a network entity (e.g. a gNB) and a communication device (e.g. a UE) to single carrier modulation.

A problem of using single carrier modulation with PDCCH is that the number of DCIs conveyed within a CORESET is time-variant. Some examples:

A single DCI containing an uplink or downlink scheduling grant can be scheduled to a user.
Two DCIs containing an uplink and a downlink grant can be scheduled to a user.
Multiple users can be scheduled simultaneously, each with one or more DCIs.

Figure 1:
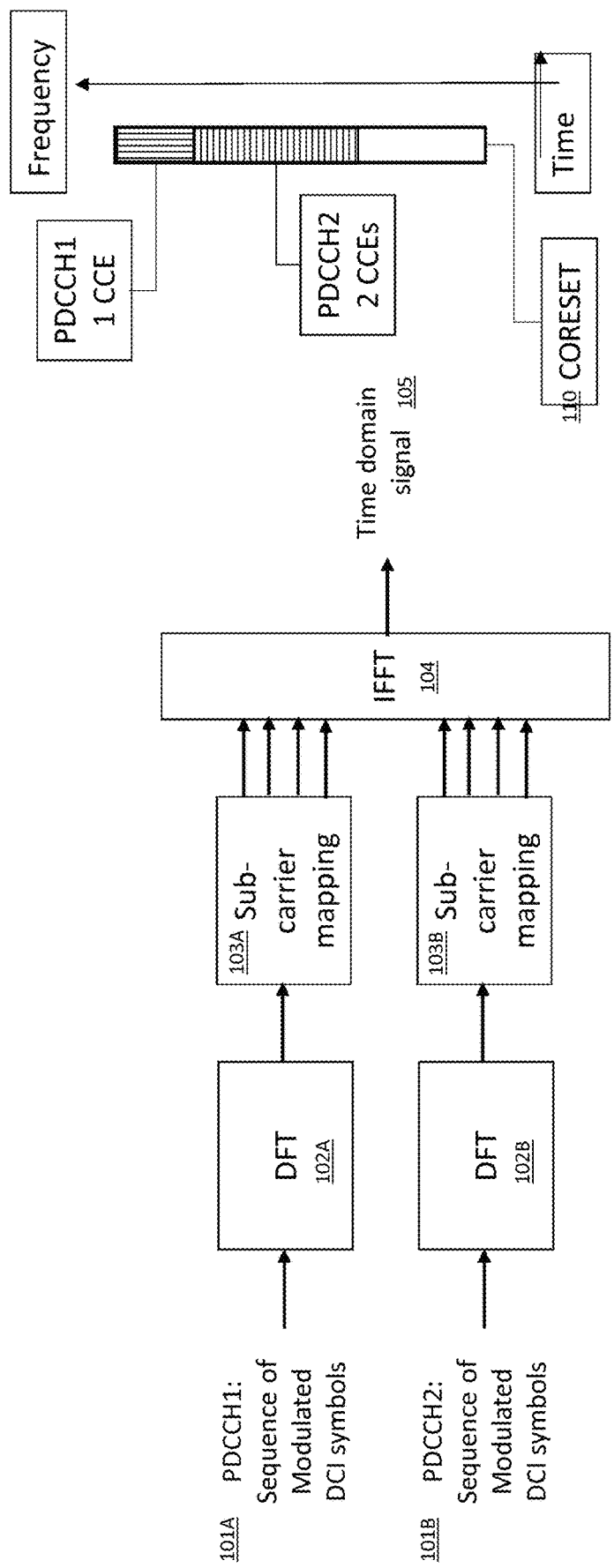
FIG. 1 shows a schematic diagram illustrating a reference scenario of transforming sequences of modulated DCI symbols into a time domain signal.

Solutions are required that provide good power efficiency with SC modulation. FIG. 1 illustrates a reference scenario of transforming sequences of modulated DCI symbols into a time domain signal.

According to FIG. 1, a sequence of modulated DCI symbols of a PDCCH1 101A comprising CCEs of CORESET 110, and a sequence of modulated DCI symbols of PDCCH2 101B comprising (different) CCEs of CORESET 110 each is subjected to a DFT in block 102A and a DFT in block 102B. The output of block 102A is subjected to sub-carrier mapping in block 103A, and the output of block 102B is subjected to sub-carrier mapping in block 103B. The output of block 103A and the output of block 103B are subjected to IFFT in block 104 which outputs a time domain signal 105.

Power efficiency is good with single DCI, but it deteriorates with multiple DCIs conveyed on the CORESET.

Figure 2:
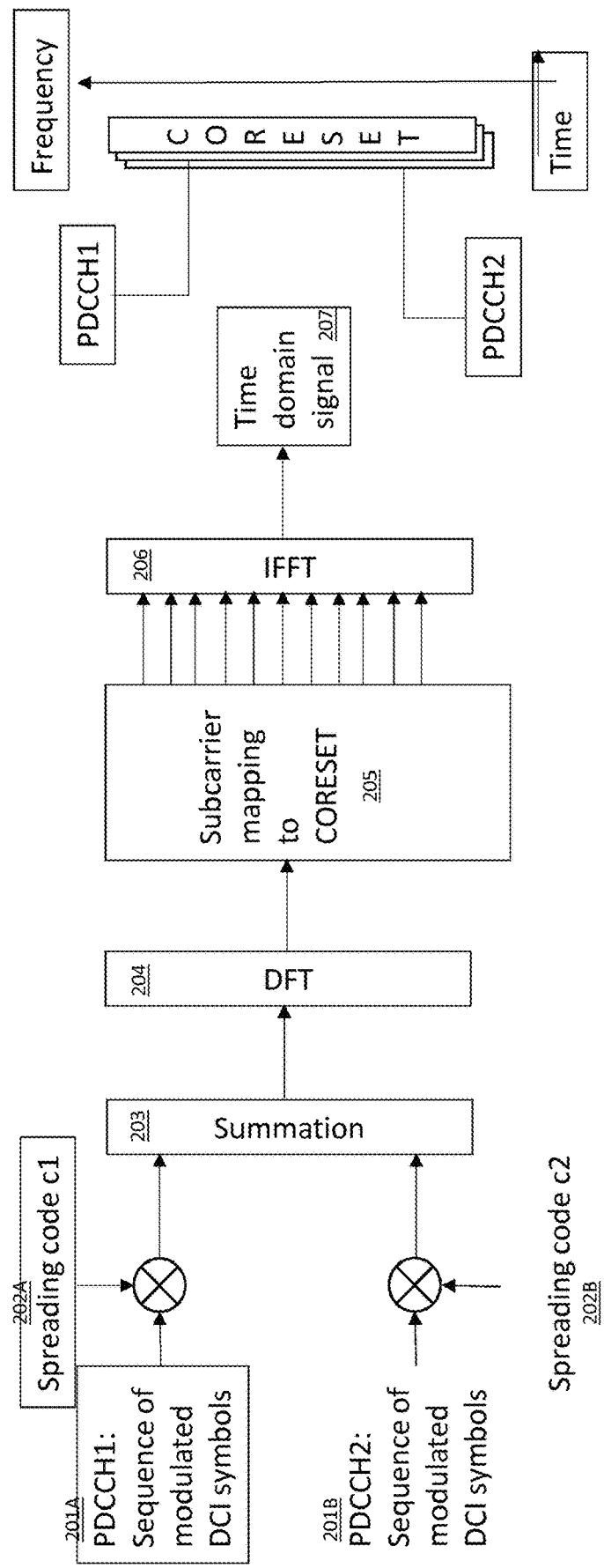
FIG. 2 shows a schematic diagram illustrating a scenario of transforming sequences of modulated DCI symbols into a time domain signal according to at least some example embodiments.

FIG. 2 shows a schematic diagram illustrating a scenario of transforming sequences of modulated DCI symbols into a time domain signal according to at least some example embodiments.

According to FIG. 2, a sequence of modulated DCI symbols (e.g. "first sequence of control information") of a first control channel (e.g. PDCCH1) 201A comprising CCEs of a CORESET is multiplied with a spreading code c1 (e.g. first spreading sequence) 202A, and a sequence of modulated DCI symbols (e.g. "further sequence of control information") of a second control channel (e.g. PDCCH2) 201B comprising (different) CCEs of the CORESET is multiplied with a spreading code c2 (e.g. "second spreading sequence") 202B. By these multiplication operations, the modulated DCI symbol sequences are spread such that after spreading signals related to the DCIs have equal size. The signals related to the DCI are a sequence of complex-valued symbols, and are obtained from the DCI payload by attaching cyclic redundancy check (CRC) information, encoding, modulation and spreading, where the encoding may include rate matching.

According to at least some example embodiments, hierarchical spreading of the modulated DCI symbol sequences is applied such that after spreading the signals related to the DCIs have equal size.

After spreading, the signals (e.g. "series of spread control information") related to the DCIs are added in block 203, and the added signals are subjected to DFT in block 204. The size of the DFT may be equal to the number of subcarriers of the CORESET, which in turn may be less or equal to the total number of active subcarriers. In block 205, the output of block 204 is subjected to subcarrier mapping to CORESET, and the output of block 205 is input to block 206 to be subjected to IFFT. Block 206 outputs a time domain signal 207.

Figure 3:
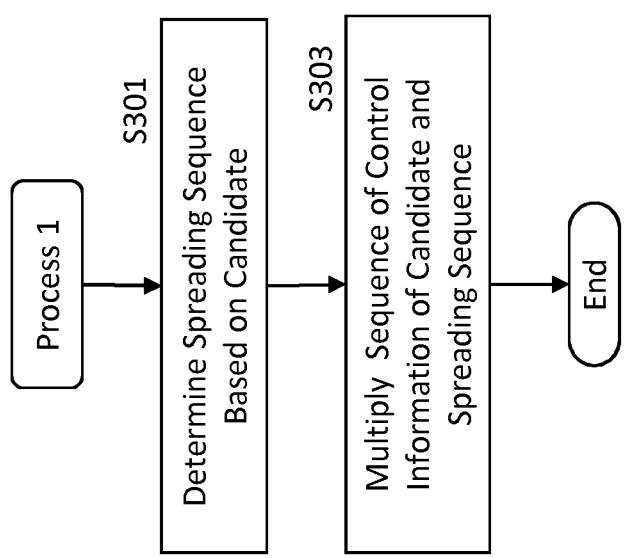
FIG. 3 shows a flowchart illustrating a process 1 for use by a network entity of a communication network according to at least some example embodiments.

FIG. 3 shows a flowchart illustrating a process 1 according to at least some example embodiments. According to an example implementation, process 1 is executed by a network entity of a communication network, such as a gNB.

In step S301, a (first) spreading sequence (e.g. spreading code c1) is determined based on a candidate of a search space set associated with a control resource set. In other words, the (first) spreading sequence (e.g. spreading code c1) is determined based on a candidate of a (first) control channel (e.g. PDCCH1) of a CORESET, wherein the candidate comprises a (first) sequence of control information (e.g. sequence of modulated DCI symbols).

In step S303, the (first) sequence of control information and the determined (first) spreading sequence are multiplied, thereby obtaining a (first) spread series of control information. Then process 1 ends.

According to process 1, given a candidate, there are some restrictions on how to determine the spreading code.

It is noted that the sequence of control information is the DCI after CRC attachment, encoding and modulation, i.e. an encoded sequence of modulation symbols.

According to at least some example embodiments, in step S301, a second spreading sequence (e.g. spreading code c2) is determined based on a candidate of a second control channel (e.g. PDCCH2) of the CORESET, wherein the candidate of the second control channel comprises a further sequence of control information (e.g. sequence of modulated DCI symbols).

In step S303, the further sequence of control information and the determined second spreading sequence are multiplied, thereby obtaining a second spread series of control information.

According to at least some example embodiments, the candidate of the first control channel is associated with a first aggregation level, and the first spread series has a predetermined length. For example, the length is derived from the CORESET size which is obtained e.g. by multiplying the number of subcarriers by the number of time domain symbols.

According to at least some example embodiments, the candidate of the second control channel has a second aggregation level, and the second spread series has the predetermined length.

According to at least some example embodiments, the first and second spread series of control information are added e.g. in block 203 of FIG. 2, the added first and second spread series of control information are transformed into frequency domain e.g. in block 204 of FIG. 2, using a transformation function comprising a number of subcarriers, and the subcarriers are mapped to the CORESET e.g. in block 205 of FIG. 2.

According to at least some example embodiments, the first spreading sequence and/or the second spreading sequence correspond to hierarchical spreading codes mapped on the candidates.

According to at least some example embodiments, the hierarchical spreading codes are mapped on the candidates such that spreading factors of the hierarchical spreading codes are inversely proportional to the aggregation levels of the candidates.

According to at least some example embodiments, the first and further sequences of control information are encoded in at least one of CCEs of the CORESET, respectively.

It is to be noted that NR uses L CCEs for the mapping of a PDCCH candidate, where L is the AL. With spreading, if the size of the spread series is equal to the CORESET size, mapping will use all CCEs of the CORESET.

According to a mapping of PDCCH candidates to CCEs, which is a kind of temporary step prior to the actual spreading in S303 of FIG. 3, candidates of control channels are provided with a respective number for each of a plurality of aggregation levels and comprise at least one of the CCEs, respectively.

According to the above-mentioned specific temporary mapping, two of the candidates have a blocking relationship if the two candidates comprise the same CCE of the CCEs.

According to at least some example embodiments, from the candidates, the candidate of the first control channel and the candidate of the second control channel are determined that do not have a blocking relationship, which will be described in more detail later on.

According to the specific temporary mapping, by using a Hash function, at least one of the CCEs is allocated for the candidates for each of the plurality of aggregation levels, and it is determined with which CCE to start with a numbering of the candidates for each of the plurality of aggregation levels, thereby providing indices for the candidates, which will be described in more detail later on.

According to an example implementation, for a candidate with a certain index, the spreading sequence (e.g. first and further spreading sequences) is determined from (i) an index of a CCE with which the candidate starts according to the specific temporary mapping, and (ii) the aggregation level (e.g. first and further aggregation levels of the first and further candidates).

In other words, for a candidate with a certain index, the spreading sequence is determined from the CCE start index and the AL.

Figure 4:
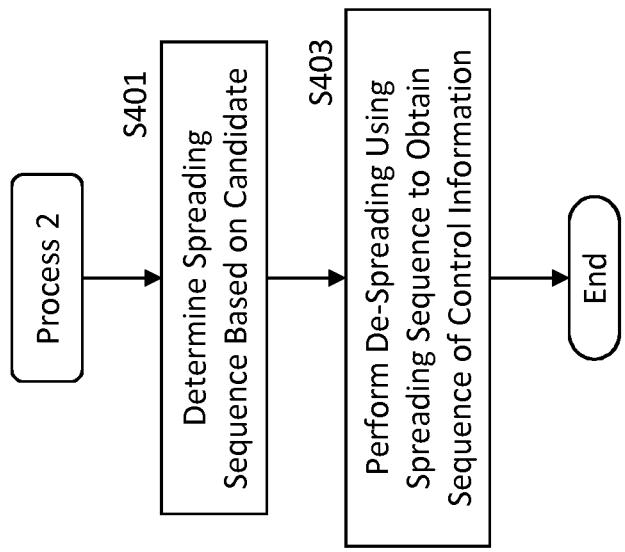
FIG. 4 shows a flowchart illustrating a process 2 for use by a communication device (e.g. a UE) according to at least some example embodiments.

FIG. 4 shows a flowchart illustrating a process 2 according to at least some example embodiments. According to an example implementation, process 2 is executed by a communication device, such as a UE.

In step S401, a spreading sequence is determined based on a candidate of a control channel of a CORESET configured for the communication device, wherein the candidate is monitored by the communication device to receive a sequence of control information for communication with a communication network.

In step S403, a signal received from the communication network is sampled, thereby obtaining at least one series of control information, and the at least one series of control information is de-spread using the determined spreading sequence, thereby obtaining the sequence of control information.

According to an example implementation, in step S403, the signal received from the communication network is transformed into frequency domain over a full active channel bandwidth, thereby obtaining a transformed signal, and the transformed signal is transformed into time domain over the bandwidth of the control resource set, thereby obtaining the at least one series of control information.

According to a mapping of PDCCH candidates to CCEs, which is a kind of temporary step prior to the actual spreading in S303 of FIG. 3, by using a Hash function, at least one of CCEs of the CORESET is allocated for candidates for each of a plurality of aggregation levels, wherein control channels are provided with a respective number for each of the plurality of aggregation levels and comprise at least one of the CCEs, respectively. By using the Hash function, it is determined with which CCE to start with a numbering of the candidates for each of the plurality of aggregation levels, thereby providing indices for the candidates, and an index of the candidate is determined.

According to an example implementation, for the candidate with a certain index, the spreading sequence is determined from (i) an index of a CCE with which the candidate starts in the above-mentioned specific temporary mapping, and (ii) the aggregation level.

According to an example implementation, the spreading sequence corresponds to a code of hierarchical spreading codes mapped on the candidates.

According to an example implementation, the hierarchical spreading codes are mapped on the candidates such that spreading factors of the hierarchical spreading codes are inversely proportional to the aggregation levels of the candidates.

Figure 5:
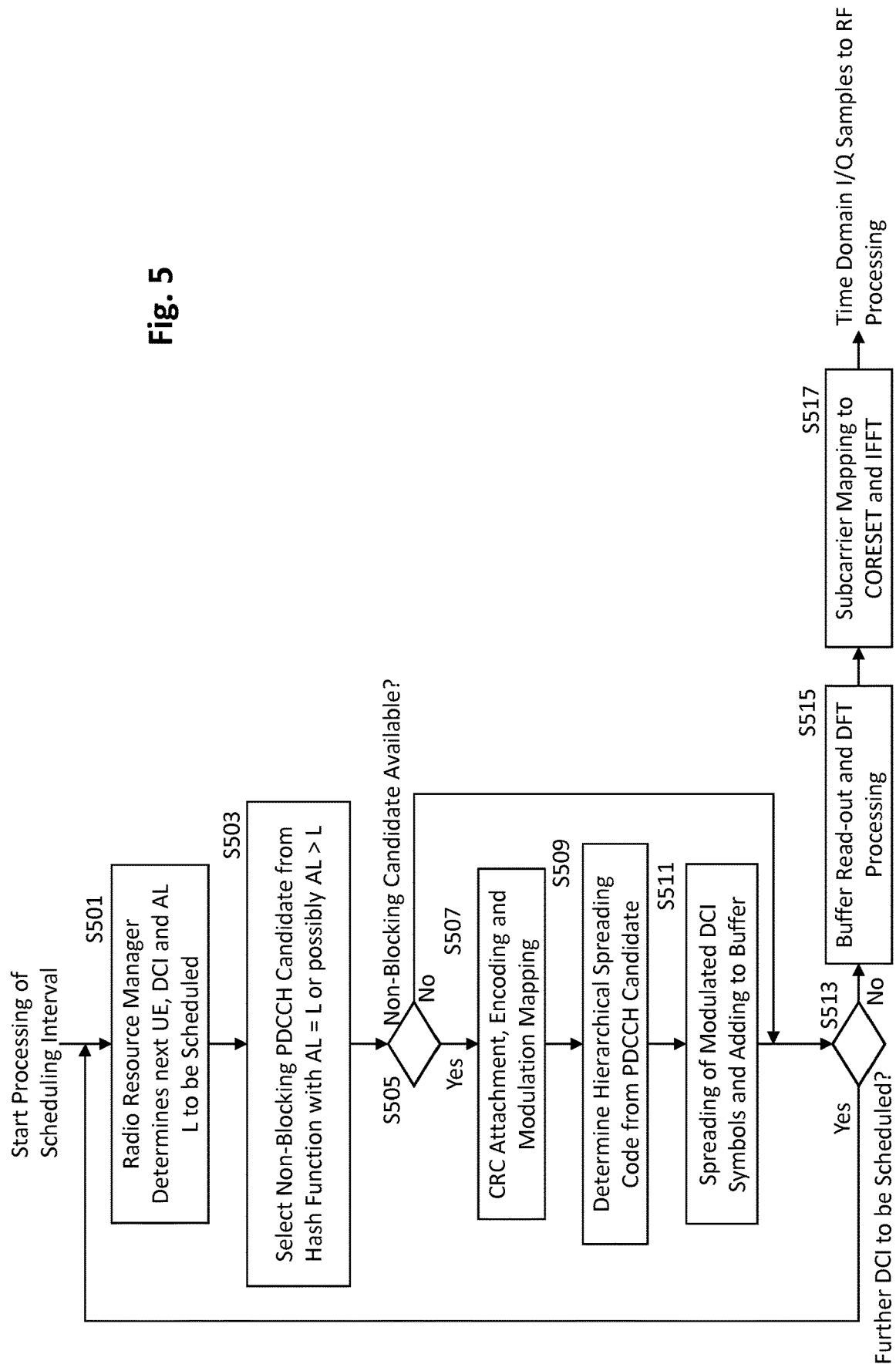
FIG. 5 shows a flowchart illustrating an example implementation of process 1 according to at least some example embodiments.

FIG. 5 shows a flowchart illustrating an example implementation of process 1 according to at least some example embodiments.

When processing of a scheduling interval is started, in step S501 a radio resource manager determines a next UE to be scheduled or the same UE which is to be scheduled more than once per scheduling interval, DCI and AL L, e.g. L=1, 2, 4, 8 or 16, to be scheduled. AL L is determined so as to provide sufficient reliability for conveying the DCI to the UE. Then the process proceeds to step S503.

In step S503, an index of a non-blocking PDCCH candidate is selected from a Hash function with AL=L, or possibly AL>L to ensure reliable transmission of the DCI. Then the process proceeds to step S505.

In step S505, it is checked whether or not such non-blocking candidate is available. In case a non-blocking candidate is not available, the process proceeds to step S513.

In case the non-blocking candidate is available, the process proceeds to step S507 in which CRC attachment, encoding and modulation mapping is performed e.g. to obtain a sequence of modulated DCI symbols. Then the process proceeds to step S509.

In step S509, a hierarchical spreading code is determined from the PDCCH candidate selected in step S503. Then the process proceeds to step S511.

In step S511, the modulated DCI symbols are spread using the spreading code determined in step S509, and the spread DCI symbols are added to a buffer e.g. similar to the summation in block 203 of FIG. 2. Then the process proceeds to step S513.

In step S513, it is checked whether or not further DCI is to be scheduled. In case further DCI is to be scheduled, the process returns to step S501. Otherwise, the process proceeds to step S515.

In step S515, spread symbols added to the buffer in step S511 are read out from the buffer and subjected to DFT processing e.g. similar as in block 204 of FIG. 2. Then the process proceeds to step S517.

In step S517, subcarrier mapping to CORESET and IFFT are performed e.g. similar as in blocks 205 and 206 of FIG. 2.

Finally, time domain I/Q samples (e.g. time domain signal 207) to be subjected to RF processing are obtained.

Figure 6:
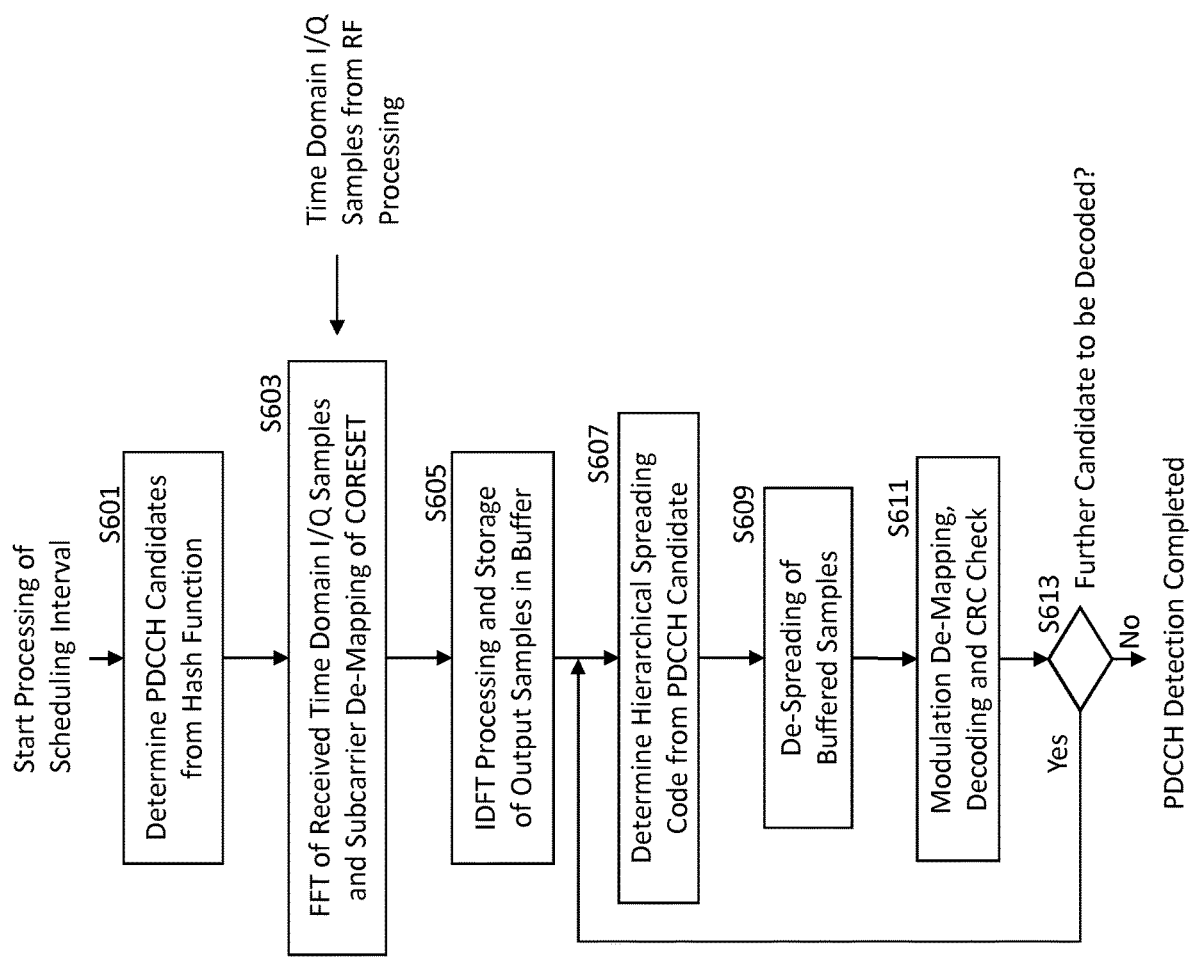
FIG. 6 shows a flowchart illustrating an example implementation of process 2 according to at least some example embodiments.

FIG. 6 shows a flowchart illustrating an example implementation of process 2 according to at least some example embodiments.

When processing of a scheduling interval is started, in step S601 PDCCH candidates are determined from a Hash function. Then the process proceeds to step S603.

In step S603, time domain I/Q samples obtained from RF processing of a signal received from a communication network, e.g. a gNB of the communication network, are subjected to an FFT, and subcarrier de-mapping of CORESET is performed. Then the process proceeds to step S605.

In step S605, IDFT processing is performed on the subcarriers de-mapped in S603, and output samples are stored in a buffer provided e.g. in the communication device. Then the process proceeds to step S607.

In step S607, a hierarchical spreading code is determined from a candidate of the PDCCH candidates determined in S601. Then the process proceeds to step S609.

In step S609, de-spreading of the buffered symbols is performed using the spreading code determined in S607. Then the process proceeds to step S611.

In step S611, modulation de-mapping, decoding and cyclic redundancy check is performed on the samples de-spread in S609. Then the process proceeds to step S613.

In step S613 it is checked whether or not there is a further candidate to be decoded. In case there is a further candidate to be decoded, the process returns to step S607. Otherwise, the PDCCH detection is completed.

In the following, an example implementation of PDCCH candidate blocking detection and mapping of PDCCH candidate to hierarchical spreading code according to at least some example embodiments will be described referring to FIGS. 7 and 8.

FIG. 7 illustrates PDCCH candidates allocated for different ALs and corresponding CCEs of a CORESET. This mapping of PDCCH candidates to CCEs is a kind of temporary step prior to the actual spreading in S303 of FIG. 3.

For each AL the number of candidates is configured by RRC, e.g. numbers of M=(4, 4, 2, 2, 1) candidates for AL (1, 2, 4, 8, 16).

A Hash function determines in pseudo-random manner which of the CCEs will be allocated, and with which CCE to start with the numbering of candidates.

According to FIG. 7, CORESET size=16 CCEs, dotted=allocated candidate, white=idle.

There is blocking between two PDCCH candidates if common CCE(s) are allocated. For example, candidate 0 of AL1 has blocking with candidate 1 of AL8 and candidate 0 of AL16, as those three candidates use CCE 6.

Figure 8:
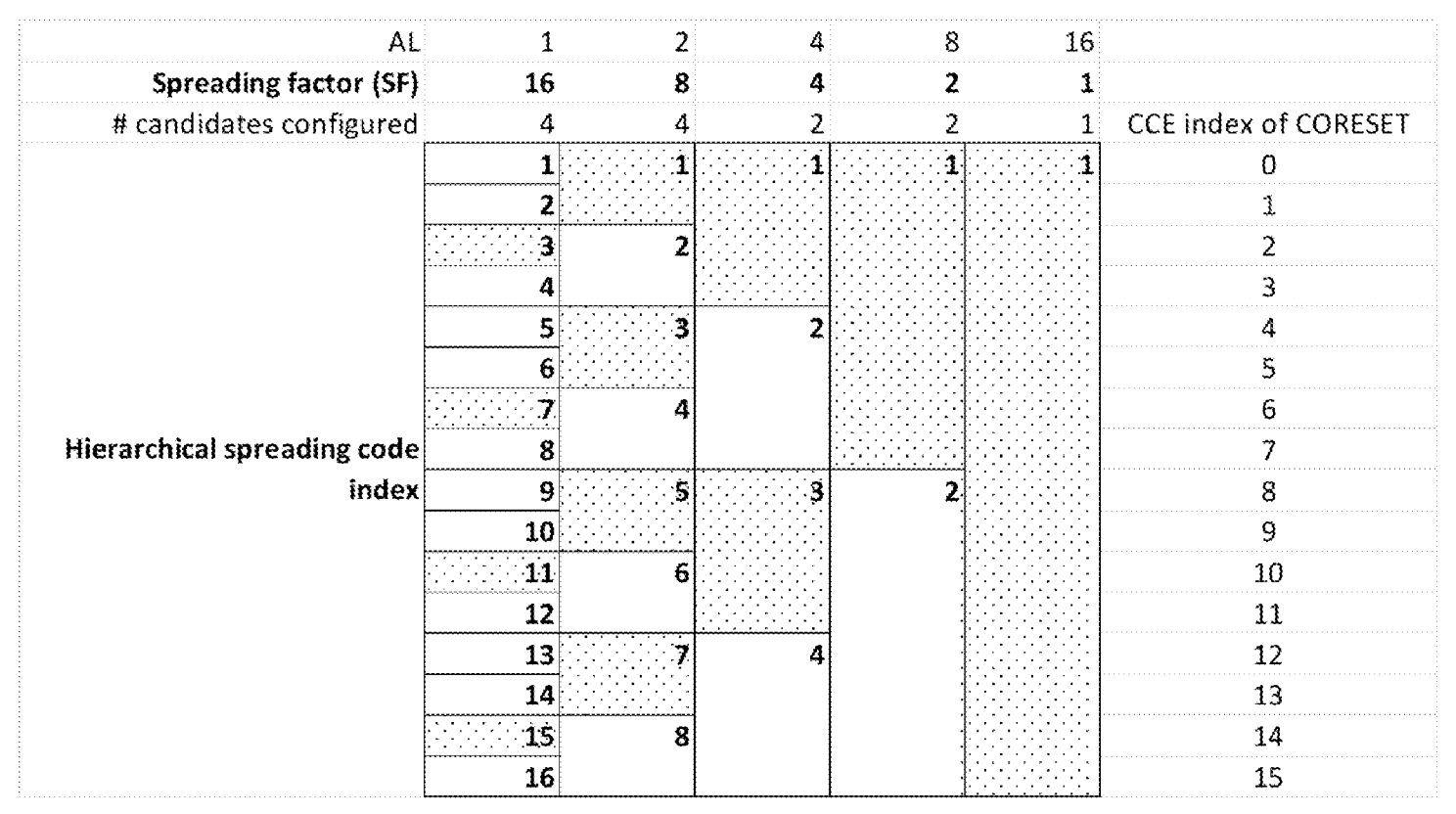

FIG. 8 illustrates hierarchical spreading codes mapped to PDCCH candidates according to at least some example implementations.

It is noted that CCE index starts from 0, while spreading code index starts from 1 according to the example implementation.

The index of the hierarchical spreading code to be used for spreading of PDCCH candidate is given by: Spreading code index=floor(CCE starting index of PDCCH candidate/AL)+1.

For example, candidate 0 of AL1 (on CCE 6) uses code $c_{16,7}$ of the code tree shown in FIG. 9, where the subscripts denote the length of the spreading code (e.g. 16) and the index (e.g. 7), respectively, where 1<=index<=length of the spreading code.

According to an example implementation,
spreading factor=CORESET size in CCE units/Aggregation level;
CORESET size=16 CCEs;
AL1=1CCE uses SF16 (codes $c_{16,1}$ . . . $c_{16,16}$);
AL2=2CCEs uses SF8 (codes $c_{8,1}$ . . . $c_{8,8}$);
AL4=4CCEs uses SF4 (codes $c_{4,1}$ . . . $c_{4,4}$);
AL8=8CCEs uses SF2 (codes $c_{2,1}$ . . . $c_{2,2}$); and
AL16=16CCEs uses SF1 (codes $c_{1,1}$)

The spreading is applied to each symbol of the modulated DCI symbol sequence, e.g. with SF16 a symbol is repeated 16 times and then multiplied with the 16-element spreading sequence.

The index of the spreading code is assigned via a Hash function.

For example, the spreading codes are Hadamard codes like those of the code tree shown in FIG. 9. Given a root sequence (c), two orthogonal longer sequences are obtained by sequence concatenation (c, c) and (c, −c).

Spreading codes having different length may not be orthogonal, e.g. in case they have the same root. This corresponds to blocking of PDCCH candidates.

For example, PDCCH1 of FIG. 2 may use AL8 with SF2 and code $c_{2,1}$ (1, 1), and PDCCH2 of FIG. 2 may use AL2 with SF8 and orthogonal code $c_{8,5}$ (1, −1, 1, −1, 1, −1, 1, −1). Thus, there is no blocking between PDCCH1 and PDCCH2.

According to at least some example embodiments, all DCIs are under spread with a single DFT, which gives good power efficiency, and UE monitors only a single SS-set, versus two or more SS-sets.

Figure 10:
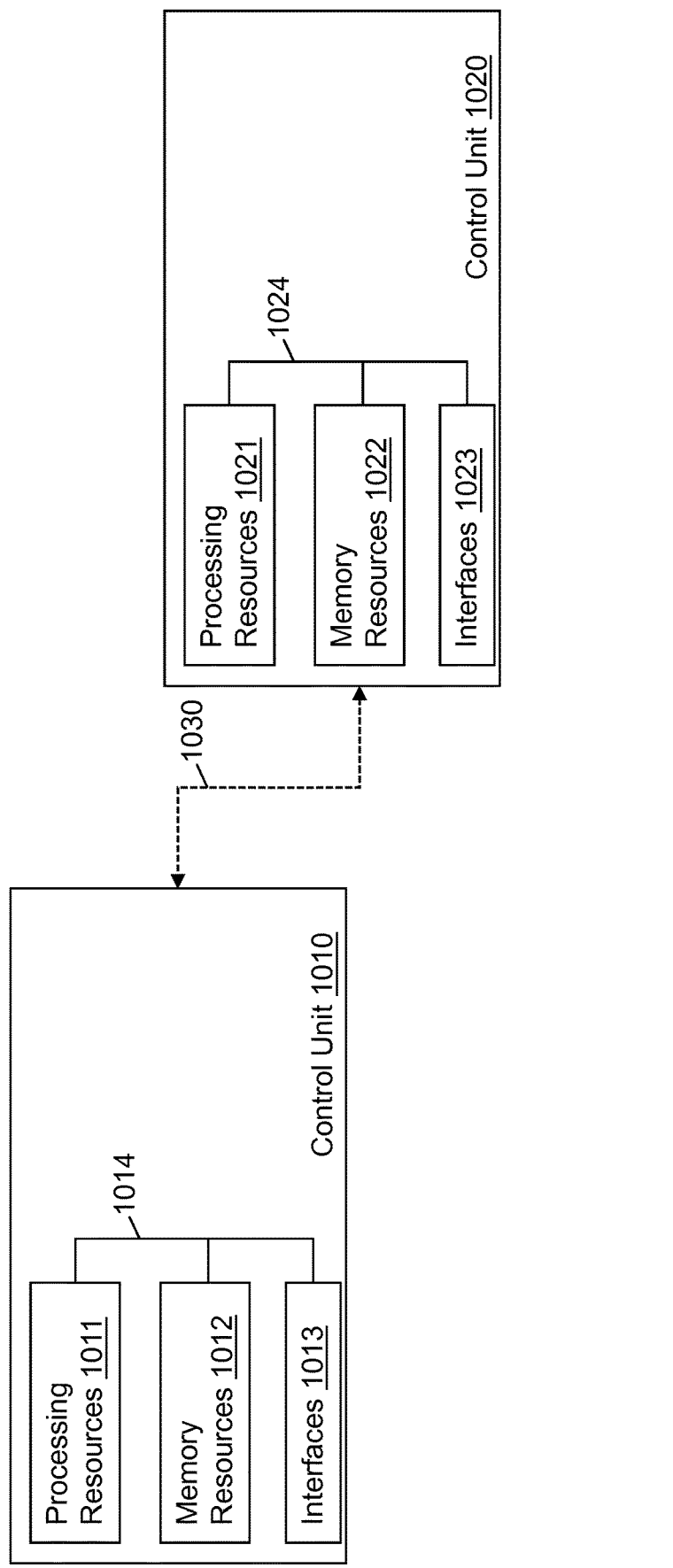
FIG. 10 shows a schematic block diagram illustrating a configuration of control units in which at least some example embodiments are implementable.

FIG. 10 shows a schematic block diagram illustrating a configuration of control units in which at least some example embodiments are implementable.

A control unit 1010 comprises processing resources (e.g. processing circuitry) 1011, memory resources (e.g. memory circuitry) 1012 and interfaces (e.g. interface circuitry) 1013, which are coupled via a connection 1014.

According to an example implementation, the memory resources 1012 store a program that, when executed by the processing resources 1011, cause the control unit 1010 to perform process 1 of FIG. 3.

According to an example implementation, the control unit 1010 is used by and/or is part of a network entity of a communication network, e.g. a gNB of the communication network.

A control unit 1020 comprises processing resources (e.g. processing circuitry) 1021, memory resources (e.g. memory circuitry) 1022 and interfaces (e.g. interface circuitry) 1023, which are coupled via a connection 1024.

According to an example implementation, the memory resources 1022 store a program that, when executed by the processing resources 1021, cause the control unit 1020 to perform process 2 of FIG. 4.

According to an example implementation, the control unit 1020 is used by and/or is part of a communication device, e.g. a UE.

The control units 1010 and 1020 are coupled via a (e.g. typically wireless) connection 1030.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, the example embodiments may be implemented by computer software stored in the memory resources 1012, 1022 and executable by the processing resources 1011, 1021, or by hardware, or by a combination of software and/or firmware and hardware in any or all of the devices shown.

In general, example embodiments of the communication device can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Further, as used in this application, the term "circuitry" refers to one or more or all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to an aspect, an apparatus is provided that comprises means for determining a first spreading sequence based on a candidate of a first control channel of a control resource set, wherein the candidate comprises a first sequence of control information, and means for multiplying the first sequence of control information and the determined first spreading sequence, thereby obtaining a first spread series of control information.

According to an example implementation, the apparatus executed process 1 shown in FIG. 3. Alternatively or in addition, the apparatus comprises and/or uses the control unit 1010 shown in FIG. 10.

According to an example embodiment, the apparatus comprises means for determining a second spreading sequence based on a candidate of a second control channel of the control resource set, wherein the candidate of the second control channel comprises a further sequence of control information, and means for multiplying the further sequence of control information and the determined second spreading sequence, thereby obtaining a second spread series of control information.

According to an example embodiment, the candidate of the first control channel is associated with a first aggregation level, and the first spread series has a predetermined length.

According to an example embodiment, the candidate of the second control channel is associated with a second aggregation level, and the second spread series has the predetermined length.

According to an example embodiment, the apparatus comprises means for adding the first and second spread series of control information, means for transforming the added first and second spread series of control information into frequency domain using a transformation function comprising a number of subcarriers, and means for mapping the subcarriers to the control resource set.

According to an example embodiment, the first spreading sequence and/or the second spreading sequence correspond to hierarchical spreading codes mapped on the candidates.

According to an example embodiment, the hierarchical spreading codes are mapped on the candidates such that spreading factors of the hierarchical spreading codes are inversely proportional to the aggregation levels of the candidates.

According to an example embodiment, the first and further sequences of control information are encoded in at least one of control channel elements of the control resource set, respectively, wherein candidates of control channels are provided with a respective number for each of a plurality of aggregation levels and comprise at least one of the control channel elements, respectively, wherein two of the candidates have a blocking relationship if the two candidates comprise the same control channel element of the control channel elements according to a specific temporary mapping between the candidates and the control channel elements.

According to an example embodiment, the apparatus comprises means for determining, from the candidates, the candidate of the first control channel and the candidate of the second control channel that do not have a blocking relationship.

According to an example embodiment, in the specific temporary mapping, by using a Hash function, at least one of the control channel elements is allocated for the candidates for each of the plurality of aggregation levels, and it is determined with which control channel element to start with a numbering of the candidates for each of the plurality of aggregation levels, thereby providing indices for the candidates, and apparatus comprises means for determining, for the candidate of the first control channel, the first spreading sequence from (i) an index of a control channel element with which the candidate starts in the specific temporary mapping, and (ii) the first aggregation level.

According to an example embodiment, the apparatus comprises means for determining, for the candidate of the second control channel, the second spreading sequence from (i) an index of a control channel element with which the candidate starts in the specific temporary mapping, and (ii) the second aggregation level.

According to an aspect, an apparatus for use by a communication device is provided. The apparatus comprises means for determining a spreading sequence based on a candidate of a control channel of a control resource set configured for the communication device, wherein the candidate is monitored by the communication device to receive a sequence of control information for communication with a communication network, means for sampling a signal received from the communication network, thereby obtaining at least one series of control information, and means for de-spreading the at least one series of control information using the determined spreading sequence, thereby obtaining the sequence of control information.

According to an example implementation, the apparatus executed process 2 shown in FIG. 4. Alternatively or in addition, the apparatus comprises and/or uses the control unit 1020 shown in FIG. 10.

According to an example embodiment, the means for sampling comprise means for transforming the signal received from the communication network into frequency domain over a full active channel bandwidth, thereby obtaining a transformed signal, and means for transforming the transformed signal into time domain over the bandwidth of the control resource set, thereby obtaining the at least one series of control information.

According to an example embodiment, according to a specific temporary mapping between candidates of control channels and control channel elements, by using a Hash function, at least one of control channel elements of the control resource set is allocated for candidates for each of a plurality of aggregation levels, wherein control channels are provided with a respective number for each of the plurality of aggregation levels and comprise at least one of the control channel elements, respectively, and it is determined with which control channel element to start with a numbering of the candidates for each of the plurality of aggregation levels, thereby providing indices for the candidates, and determining an index of the candidate, and the apparatus comprises means for determining, for the candidate, the spreading sequence from (i) an index of a control channel element with which the candidate starts in the specific temporary mapping, and (ii) the aggregation level.

According to an example embodiment, the spreading sequence corresponds to a code of hierarchical spreading codes mapped on the candidates.

According to an example embodiment, the hierarchical spreading codes are mapped on the candidates such that spreading factors of the hierarchical spreading codes are inversely proportional to the aggregation levels of the candidates.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
   determining a first spreading sequence and a second spreading sequence based on a candidate of a first control channel and a candidate of a second control channel of a control resource set separately, wherein the candidate of a first control channel comprises a first sequence of control information, the candidate of the second control channel comprises a further sequence of control information; and
   multiplying the first sequence of control information and the determined first spreading sequence, thereby obtaining a first spread series of control information;
   multiplying the further sequence of control information and the determined second spreading sequence, thereby obtaining a second spread series of control information;
   adding the first spread series of control information and second spread series of control information;
   transforming the added first and second spread series of control information into frequency domain using a transformation function comprising a number of subcarriers;
   mapping the subcarriers to the control resource set,
   wherein the first and further sequences of control information are encoded in at least one of control channel elements of the control resource set, respectively,
   wherein candidates of control channels are provided with a respective number for each of a plurality of aggregation levels and comprise at least one of the control channel elements, respectively, and
   wherein two of the candidates have a blocking relationship if the two candidates comprise the same control channel element of the control channel elements according to a specific temporary mapping between the candidates and the control channel elements;
   determining, from the candidates, the candidate of the first control channel and the candidate of the second control channel that do not have a blocking relationship;
   wherein in the specific temporary mapping, by using a Hash function, at least one of the control channel elements is allocated for the candidates for each of the plurality of aggregation levels, and it is determined with which control channel element to start with a numbering of the candidates for each of the plurality of aggregation levels, thereby providing indices for the candidates, and wherein the method further comprises:
   determining, for the candidate of the first control channel, the first spreading sequence from (i) an index of a control channel element with which the candidate starts in the specific temporary mapping, and (ii) a first aggregation level; and/or
   determining, for the candidate of the second control channel, the second spreading sequence from (i) an index of a control channel element with which the candidate starts in the specific temporary mapping, and (ii) a second aggregation level.

2. The method of claim 1,
   wherein the candidate of the first control channel is associated with a first aggregation level, and the first spread series has a predetermined length, and/or
   wherein the candidate of the second control channel is associated with a second aggregation level, and the second spread series has the predetermined length.

3. The method of claim 1, wherein the first spreading sequence and/or the second spreading sequence correspond to hierarchical spreading codes mapped on the candidates.

4. The method of claim 3, wherein the hierarchical spreading codes are mapped on the candidates such that spreading factors of the hierarchical spreading codes are inversely proportional to the aggregation levels of the candidates.

5. An apparatus comprising at least one processor and at least one memory including computer program code, the at least one memory and the computer program code configured to, with the at least one processor, cause the apparatus at least to perform:
   determining a first spreading sequence and a second spreading sequence based on a candidate of a first control channel and a candidate of a second control channel of a control resource set separately, wherein the candidate of a first control channel comprises a first sequence of control information, the candidate of the second control channel comprises a further sequence of control information; and
   multiplying the first sequence of control information and the determined first spreading sequence, thereby obtaining a first spread series of control information;
   multiplying the further sequence of control information and the determined second spreading sequence, thereby obtaining a second spread series of control information;
   adding the first spread series of control information and second spread series of control information;
   transforming the added first and second spread series of control information into frequency domain using a transformation function comprising a number of subcarriers;
   mapping the subcarriers to the control resource set,
   wherein the first and further sequences of control information are encoded in at least one of control channel elements of the control resource set, respectively,
   wherein candidates of control channels are provided with a respective number for each of a plurality of aggregation levels and comprise at least one of the control channel elements, respectively, and
   wherein two of the candidates have a blocking relationship if the two candidates comprise the same control channel element of the control channel elements according to a specific temporary mapping between the candidates and the control channel elements;

determining, from the candidates, the candidate of the first control channel and the candidate of the second control channel that do not have a blocking relationship, wherein in the specific temporary mapping, by using a Hash function, at least one of the control channel elements is allocated for the candidates for each of the plurality of aggregation levels, and it is determined with which control channel element to start with a numbering of the candidates for each of the plurality of aggregation levels, thereby providing indices for the candidates, and wherein the computer program code further configured to cause the apparatus to perform:

determining, for the candidate of the first control channel, the first spreading sequence from (i) an index of a control channel element with which the candidate starts in the specific temporary mapping, and (ii) a first aggregation level; and/or determining, for the candidate of the second control channel, the second spreading sequence from (i) an index of a control channel element with which the candidate starts in the specific temporary mapping, and (ii) a second aggregation level.

6. The apparatus of claim 5,
wherein the candidate of the first control channel is associated with a first aggregation level, and the first spread series has a predetermined length, and/or
wherein the candidate of the second control channel is associated with a second aggregation level, and the second spread series has the predetermined length.

7. The apparatus of claim 5, wherein the first spreading sequence and/or the second spreading sequence correspond to hierarchical spreading codes mapped on the candidates.

8. The apparatus of claim 7, wherein the hierarchical spreading codes are mapped on the candidates such that spreading factors of the hierarchical spreading codes are inversely proportional to the aggregation levels of the candidates.

9. An apparatus for use by a communication device, the apparatus comprising at least one processor and at least one memory including computer program code, the at least one memory and the computer program code configured to, with the at least one processor, cause the apparatus at least to perform:

determining a spreading sequence based on a candidate of a control channel of a control resource set configured for the communication device, wherein the candidate is monitored by the communication device to receive a sequence of control information for communication with a communication network;

sampling a signal received from the communication network, thereby obtaining at least one series of control information, wherein according to a specific temporary mapping between candidates of control channels and control channel elements, by using a Hash function, at least one of control channel elements of the control resource set is allocated for candidates for each of a plurality of aggregation levels, wherein control channels are provided with a respective number for each of the plurality of aggregation levels and comprise at least one of the control channel elements, respectively, and it is determined with which control channel element to start with a numbering of the candidates for each of the plurality of aggregation levels, thereby providing indices for the candidates, and determining an index of the candidate, determining, for the candidate, the spreading sequence from (i) an index of a control channel element with which the candidate starts in the specific temporary mapping, and (ii) the aggregation level; and de-spreading the at least one series of control information using the determined spreading sequence, thereby obtaining the sequence of control information.

10. The apparatus of claim 9, wherein the sampling comprises:

transforming the signal received from the communication network into frequency domain over a full active channel bandwidth, thereby obtaining a transformed signal; and transforming the transformed signal into time domain over the bandwidth of the control resource set, thereby obtaining the at least one series of control information.

11. The apparatus of claim 9, wherein the spreading sequence corresponds to a code of hierarchical spreading codes mapped on the candidates.

12. The apparatus of claim 11, wherein the hierarchical spreading codes are mapped on the candidates such that spreading factors of the hierarchical spreading codes are inversely proportional to the aggregation levels of the candidates.

* * * * *